March 30, 1948. W. W. DALE 2,438,844
BASKET
Filed June 20, 1945
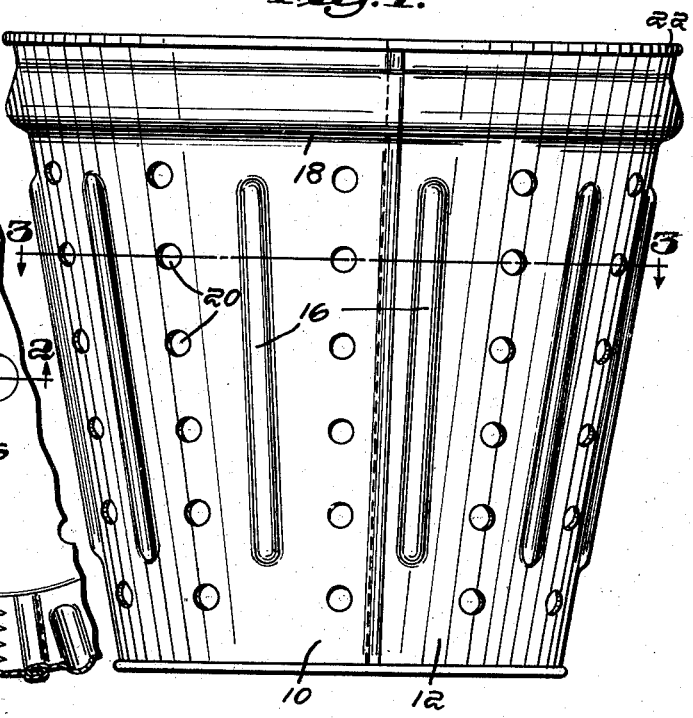
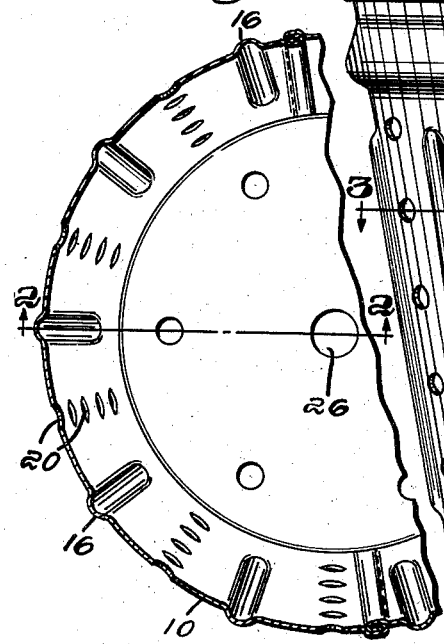
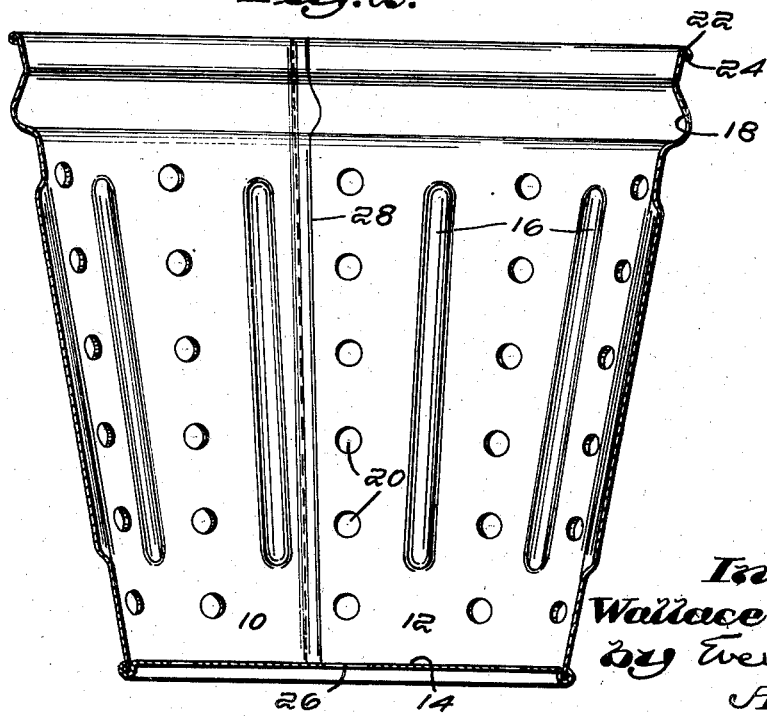
Inventor:
Wallace W. Dale,
by Everett E. Kent
Attorney Patented Mar. 30, 1948

2,438,844

UNITED STATES PATENT OFFICE 2,438,844

BASKET

Wallace W. Dale, Barre Center, N. Y.

Application June 20, 1945, Serial No. 600,441

1 Claim. (Cl. 220—83)

This invention relates to baskets.

More particularly it relates to baskets used for the harvesting of tomatoes and other vegetable products; but it can be used with advantage for other purposes.

It provides an improvement upon what was disclosed in the Patent 2,367,566, granted to me January 16, 1945. The invention there patented deals particularly with the problem of preventing the occurrence of mold and other deleterious micro-organic contents sometimes found in canned and bottled products of fruit and vegetables. Such deleterious contents are herein referred to by the general term "mold"; and the word "fruit" is herein used to indicate generally all kinds of fruit and vegetables for whose handling the basket of the invention is applicable.

The evil which is to be eliminated is well illustrated in the tomato products packing industry, where mold is of such great importance that the Food and Drug Administration of the United States regularly makes inspections in factories and in markets, to seize and to condemn vitiated tomato products. This evil is considered so unavoidable that the Administration has established a permissible "mold count tolerance." Nevertheless many thousand cases of tomato products are condemned by government agents and courts, each year, because of this evil, notwithstanding care exercised by packers; and these condemnations are in addition to the quantities of fruit which packers lose by themselves detecting mold before the packing is completed. The mold, and the risk of its occurrence, are matters causing much anxiety of packers, as well as occasioning trouble and loss.

The said patent discloses my conception that the evil arises largely from the baskets which are ordinarily used to convey freshly picked tomatoes from the field to the factory. Such baskets are made of wood slats. In the basket some of the fruit encounters rough surfaces of wood and jagged points of tacks and staples by which its skin becomes broken with the consequence that deposits of juice and pulp become absorbed in crevices and between fibres of the wood of the basket, to an extent and with a permanence which are beyond the power of complete removal by any commercially practicable cleaning process. Such deposits, left by former contents of a basket, can constitute nutrient culture media in which fungus or other germs of microscopic size can develop foci of growth which, in further use of the basket, can infect fruit that comes to have contact with any of them. Delays occur in the handling of harvested fruit, especially when simultaneous ripening requires the fruit to be picked faster than the rate at which it can be handled by the factory. These contacts and delays, coupled at times with adverse weather conditions, give opportunity for spread of micro-organic infection while the fruit waits in baskets, or in bins after being dumped from baskets.

The said patent further discloses my conception that the fruit can be protected from mold infection by providing a suitable structure for the basket into which it is to be harvested. This structure tends to prevent the occurrence and retention of deposits from broken fruit, thus to inhibit the occurrence of foci of infection; and also tends to prevent contact of fruit with such foci, if it nevertheless happens that any of such ever are carried by the basket. The patented basket is made of slats of smooth non-fibrous material, so assembled that they and their fastenings are devoid of interiorly projecting edges or points that could break the skin of contained fruit, and devoid of crevices in which residues of former contents could be touched by fruit held in the basket, if any such residues should be so contained. Thus all touchable surfaces are fully cleanable under commercial conditions, and the basket is one that routine washing will sterilize to a degree that is efficient for avoiding the infection of fresh fruit with mold. And so the basket structure can operate to eliminate from the fruit packing industry what I believe to be the main source of mold.

The present improvement makes a basket which is both better for attaining and maintaining this state of sterility, and is lighter, stronger, better for handling and less expensive in manufacture. Its sheet wall is continuous through rib-like deformations of curvilinear cross-section, whose arrangement relative to each other constitutes a sort of circular multi-stemmed T embodied in the wall. The horizontal line of the T preferably has greater spread and depth of cross-sectional curvature than the vertical lines of its multiple stem. This horizontal rib, preferably located at a little space below the top edge of the basket, may be a circumferential salient projection outward from the side wall of the basket, formed in the sheet stock of the wall. When set with its curvature extending to about two inches below the top rib, as illustrated, this constitutes a circular handle of the basket affording a firm grip at every place around the top. When a person's palm rests on the top edge, his thumb and fingers fit under good oblique holding surfaces both inside and outside of this curve of the wall of the basket. The T-combination of a horizontal rib with several vertical ribs set at intervals around in the tapering wall makes the structure so very strong that it can be made of relatively thin and light sheet stock and yet never be at risk of collapse or deformation by any ordinary mishandling.

This basket can be made in quantity at low cost by simple sheet metal stamping. The wall and bottom preferably have holes for ventilation of contents and for inflow and outflow of water in washing. If it is made of three sheets, as illustrated, the side and bottom joinders of sheets may be by interfolded edges rolled smooth; and the top edge of the basket may be rolled into a smooth bead around a wire; but the basket may be otherwise made, while still embodying the invention.

The said ribs preferably are pressed outward, in bas-relief, with no sharp interior angles, but only curves.

The embodiment of the invention shown in the accompanying drawing is illustrative. It is intended that the patent shall cover, by suitable expression in the accompanying claim, whatever features of patentable invention exist in the disclosure made.

In the drawing:

Figure 1 is a side elevation of a basket embodying the invention;

Figure 2 is a similar view in medial vertical section, as on the line 2—2 of Figure 3; and Figure 3 is a fragment of a plan of the same, in section on the line of 3—3 of Figure 1.

The specimen of basket represented in the drawing is composed of three sheets, 10 and 12 constituting the walls and 14 the bottom. The walls, which are preferably conical, may be converted from flat sheets by a stamping process, which may include the punching of any desired perforations 20, and the pressing out of each wall sheet to make the linear ribs, vertical 16 and horizontal 18. These ribs are curvilinear deformations of the sheet, preferably outward, so that every bit of surface which faces inward, and is liable to be touched by any fruit in the basket, may be of smoothly rounded character. The holes 20, punched outward, will naturally have edges without any burr, and these edges can be rounded by an applied tool if that is found desirable.

The horizontal member of the multi-stemmed T formation of ribs stands preferably at a little space below the top edge of the basket. If the cross-section curve of this horizontal rib begins about a half inch below the terminal bead 22 where the margins of the sheets 10, 12 are rolled about a binding wire 24, and extends down the wall an inch or two, and has an outward depth of a half inch or so, the lower part of its exterior surface and the upper part of its interior surface each constitute an oblique surface facing downward, under the interior of which faces both thumbs can engage, and under the exterior of which surfaces all other of a person's fingers can engage, with a pinch-grasp between thumb and fingers, for easily carrying a filled basket. The arcuate cross-sectional character of this rib provides an arch formation extending horizontally around the region of the basket where it is, i. e., in the region where the top ends of the vertical ribs are. The consequent stiffening of this region tends to maintain the top portions of the vertical stems so stiffly at their distance from the center of the basket that the body of the basket wall cannot be easily indented there or anywhere below. The horizontal rib support of the top ends of the vertical ribs combines with the vertical extent of those ribs to make ineffective every inward crushing force unless great enough to bend one of the ribs. Thereby the stiffness which those vertical ribs provide, against a bending from their straightness, becomes effective to prevent a collapse of the basket by lateral compression, thus making secure the form of the basket as a whole, notwithstanding its weakening by removal of metal from the wall between the ribs at the holes 20. Also, the circular bulge, which the top 18 of the T-combination makes in the basket wall, extends out far enough to constitute an overhanging ledge or lug, by which the basket rests loosely, on the top bead 22 of the basket below it, when nested in a stack, so that the difficulty ordinarily experienced in separating conical baskets out of a stack does not exist.

The muscular-relief character of the oblique surfaces results because the altitude, of this salient projection from the side wall, approximates the thickness of a human hand; and the interior gorge between its upper concave and lower concave surfaces has width to receive a human thumb. The lower outer face combines with the upper inner face to constitute a circumferential handle of great practical utility for a two-handed lifting of the basket and contents. This is because the bulge ramps, extending outward and extending inward, function as lugs under which a person's thumb on the inside, and, on the outside, his forefinger backed by the strength of the other fingers and of the hand and of the wrist can engage as under lugs. The muscular difficulty of gripping a heavy basket by frictionally pinching its margin is eliminated. A mild pinch-grasp puts the thumbs and all of the fingers under the lugs, so that no muscular effort is needed to get a grip. A person's hands become ledges on which the basket hangs; and his muscular effort becomes limited to approximately only that needed to sustain the weight.

The holes provide for cleaning by immersion, and one or more of them, as 26, in the bottom, may be large enough to admit a hose nozzle.

The seams of a basket thus made will have narrow crevices 28 open toward the interior of the basket. If it should happen that fruit juice is not fully removed from the deeper parts of these crevices by a routine cleaning, it will nevertheless be true that all parts of the basket wall which can be touched by fruit contained within the basket are accessible for thorough cleaning by routine methods. However, these crevices can be filled with solder or other soft metal having a smooth face, if found desirable, so that the interior face of the basket wall is really smooth, in the sense of not having either a roughness that will abrade a skin, or a crevice that can maintain a source of infection. A basket thus constructed can be made of sheet metal at such low cost, and with such lightness, strength and ease of handling, and for so many years of durability, that it has utility for many and various purposes; while it has especial utility in those branches of the fruit packing industry in which there is danger of mold.

I claim:

A portable metal container having a bottom and a surrounding perforated side wall of stiff sheet material having a beaded top edge, the side wall tapering inwardly and downwardly to the bottom, the top being open, characterized in that a portion of said side wall, located in close proximity to its top edge, extends outwardly from the main line of its taper and also extends downwardly at a distance outwardly from that line and forming a substantially frusto-conical surface and having a return bend in an arcuate path to that line, these said extents of side wall constituting an interior lug facing downwardly, an interior recess under that lug, and an exterior lug facing downwardly, the said lugs, recess and edge of the wall being combined to constitute a continuous peripheral handle by which the container can be carried when grasped by hands astride the edge without a strong frictional grasp being required.

WALLACE W. DALE.

REFERENCES CITED

The following references are of record in the file of this patent:

UNITED STATES PATENTS

| Number | Name | Date |
| --- | --- | --- |
| 908,579 | Knobloch | Jan. 5, 1909 |
| 1,402,830 | Boyle, Sr. | Jan. 10, 1922 |
| 2,060,468 | Mitchell | Nov. 10, 1936 |